US010180955B1

(12) United States Patent
Kayyoor et al.

(10) Patent No.: US 10,180,955 B1
(45) Date of Patent: Jan. 15, 2019

(54) SYSTEMS AND METHODS FOR APPLYING CONTENT-BASED RETENTION POLICIES TO DATA ARTIFACTS

(71) Applicant: Veritas Technologies, LLC, Mountain View, CA (US)

(72) Inventors: Ashwin Kayyoor, Sunnyvale, CA (US); Karthik Rajamony, Rancho Palos Verdes, CA (US); Henry Aloysius, San Jose, CA (US); Scott Kaiser, Belmont, CA (US)

(73) Assignee: Veritas Technologies LLC, Mountain View, CA (US)

( * ) Notice: Subject to any disclaimer, the term of this patent is extended or adjusted under 35 U.S.C. 154(b) by 268 days.

(21) Appl. No.: 15/190,041

(22) Filed: Jun. 22, 2016

(51) Int. Cl.
*G06F 17/30* (2006.01)

(52) U.S. Cl.
CPC .. *G06F 17/30371* (2013.01); *G06F 17/30085* (2013.01); *G06F 17/30675* (2013.01)

(58) Field of Classification Search
None
See application file for complete search history.

(56) References Cited

U.S. PATENT DOCUMENTS

| | | | | |
|---|---|---|---|---|
| 8,856,081 | B1* | 10/2014 | Chaudhari | G06F 17/30085 707/661 |
| 9,946,971 | B1* | 4/2018 | Kannan | G06N 5/022 |
| 2004/0059785 | A1* | 3/2004 | Blume | G06Q 10/109 709/206 |
| 2007/0061359 | A1* | 3/2007 | Kilday | H04L 51/00 |
| 2008/0005204 | A1* | 1/2008 | Prus | G11B 27/002 |
| 2010/0257141 | A1* | 10/2010 | Monet | G06F 17/30011 707/665 |
| 2012/0271793 | A1* | 10/2012 | Gokhale | G06F 17/30902 707/609 |
| 2015/0161194 | A1* | 6/2015 | Provenzano | G06F 17/30371 707/690 |
| 2016/0004882 | A1* | 1/2016 | Ballai | G06F 21/6245 726/30 |

(Continued)

OTHER PUBLICATIONS

Mimcast, mimcast.com, http://ww1.mimcast.com/, as accessed May 26, 2016, (May 7, 2016).

(Continued)

*Primary Examiner* — Bai D Vu
(74) *Attorney, Agent, or Firm* — FisherBroyles LLP

(57) ABSTRACT

The disclosed computer-implemented method for applying content-based retention policies to data artifacts may include (1) identifying one or more features of a data artifact detected on a computing system, (2) identifying a collection of data artifacts that are (A) stored on at least one storage system and (B) retained in accordance with a set of retention policies, (2) determining, based at least in part on the features, that the data artifact detected on the computing system and at least one data artifact within the collection exceed a certain level of similarity relative to one another, (3) analyzing at least one retention policy of the data artifact within the collection, and then (4) providing a suggestion to apply the retention policy of the data artifact within the collection to the data artifact detected on the computing system. Various other methods, systems, and computer-readable media are also disclosed.

20 Claims, 6 Drawing Sheets

(56) References Cited

U.S. PATENT DOCUMENTS

2018/0189301 A1* 7/2018 Kannan ............... G06F 21/6209

OTHER PUBLICATIONS

HP, http://www.hp.com/country/us/en/welcome.html, as accessed May 26, 2016, HP Development Company, L.P., (Dec. 4, 2003).

Proofpoint, https://www.proofpoint.com/us, as accessed May 26, 2016, (Jan. 26, 2015).

Named-entity recognition, https://en.wikipedia.org/wiki/Named-entity_recognition, as accessed May 26, 2016, Wikipedia, (Dec. 15, 2005).

Mimecast, https://www.mimecast.com/, as accesed May 26, 2016, (Aug. 6, 2003).

Content-Based Data Retention, https://www.commvault.com/solutions/by-function/retention-and-compliance/content-based-retention, as accessed May 26, 2016, Commvault, (Oct. 2, 2015).

Data Aging—Getting Started, https://documentation.commvault.com/commvault/v10/article?p=features/data_aging/data_aging.htm#Setting_Up_the_Basic_Retention_Rule, as accessed May 26, 2016, Commvault Systems Inc., (1997).

Enterprise Search and eDiscovery, http://www.commvault.com/solutions/by-function/retention-and-compliance/enterprise-search-and-ediscovery, as accessed May 26, 2016, Commvault, (Oct. 2, 2015).

Elasticsearch, https://www.elastic.co/, as accessed May 26, 2016, (Aug. 13, 2013).

Solr, http://lucene.apache.org/solr/, as accessed May 26, 2016, Apache Lucene, The Apache Software Foundation, (Jan. 19, 2007).

* cited by examiner

SYSTEMS AND METHODS FOR APPLYING CONTENT-BASED RETENTION POLICIES TO DATA ARTIFACTS

BACKGROUND

Retention policies often control whether storage systems are to maintain, delete, and/or move data artifacts. For example, an organization (such as a business or government entity) may apply a 2-year retention policy to certain data, a 5-year retention policy to other data, and/or a legal hold to further data. In this example, each time-based retention policy may include, identify, and/or define a retention period during which the corresponding data is to remain stored within the storage system. In contrast, a legal hold may define and/or dictate an indefinite retention period during which the corresponding data is to remain stored within the storage system.

Once the retention period corresponding to a certain data artifact expires, one of the organization's computers may modify that data artifact as dictated by the retention policy. For example, the organization's computer may move the data artifact whose retention period has expired from a primary storage tier (such as a solid-state drive) to a secondary storage tier (such as a hard disk drive) in accordance with the retention policy. In another example, the organization's computer may totally delete the data artifact whose retention period has expired in accordance with the retention policy.

As technology advances and digital media increases, so too does the amount of data stored and/or maintained by organizations. These increases often drive up the costs associated with storing and/or maintaining data for the organizations. As a result, some organizations may have a need to reduce the amount of data stored and/or maintained by their systems long-term. Unfortunately, the organizations' administrators may be unable to accurately determine the most appropriate retention policy for each data artifact due to insufficient information and/or time constraints. As a result, these administrators may end up guessing and/or making a split-second judgment call regarding which retention policy to apply to certain data artifacts.

The instant disclosure, therefore, identifies and addresses a need for systems and methods for applying content-based retention policies to data artifacts.

SUMMARY

As will be described in greater detail below, the instant disclosure describes various systems and methods for applying content-based retention policies to data artifacts by providing retention-policy suggestions based at least in part on the retention policies applied to similar data artifacts.

In one example, a system for applying content-based retention policies to data artifacts may include several modules stored in memory, including (1) an identification module that (A) identifies one or more features of at least one data artifact detected on a computing system and (B) identifies a collection of data artifacts that are (I) stored on at least one storage system and (II) retained in accordance with a set of retention policies, (2) an analysis module that (A) determines, based at least in part on the features, that the data artifact detected on the computing system and at least one data artifact within the collection exceed a certain level of similarity relative to one another and (B) analyzes at least one retention policy of the data artifact within the collection, (3) a suggestion module that provides a suggestion to apply at least a portion of the retention policy of the data artifact within the collection to the data artifact detected on the computing system, and (4) at least one physical processor that executes the identification module, the analysis module, and the suggestion module.

In one example, the analysis module may analyze the data artifact detected on the computing system. In this example, the analysis module may extract the features of the data artifact based at least in part on the analysis. The features of the data artifact may include, represent, and/or be identified in metadata of the data artifact.

In one example, the identification module may identify at least one keyword that is representative of the data artifact. In this example, the analysis module may create a subset of text that is included in content of the data artifact and represents a certain part of speech. Additionally or alternatively, the analysis module may create another subset of text that is included in the content of the data artifact and represents certain categories of words consistent with Name-Entity Recognition (NER). The analysis module may then determine the keyword by identifying which text is included in the subset of text and excluded from the other subset of text.

In one example, the analysis module may determine that the data artifact within the collection includes the keyword. In this example, the analysis module may create a set of keywords that are representative of the data artifact. For example, the analysis module may determine that at least one word co-occurred with at least one keyword extracted from the data artifact in a certain number of keyword searches recorded in a history of keyword searches of the collection of data artifacts. The analysis module may then add the word along with the keyword to the set of keywords representative of the data artifact.

In one example, the analysis module may determine that the data artifact within the collection includes a certain amount of the keywords within the set. Additionally or alternatively, the analysis module may generate a vector representation of the set of keywords that facilitates comparing the features of the data artifact detected on the computing system to the features of the data artifacts with in the collection.

In one example, the analysis module may search the collection for any data artifacts whose similarity to the data artifact detected on the computing system exceeds the certain level by determining which of the data artifacts within the collection have features that match the features of the data artifact detected on the computing system. In another example, the analysis module may determine that the data artifact detected on the computing system and a plurality of data artifacts within the collection exceed the certain level of similarity. In this example, the analysis module may identify a plurality of retention policies that apply to the plurality of data artifacts. The analysis module may then determine which retention policy is most common among the plurality of retention policies that apply to the plurality of data artifacts. The suggestion module may recommend that the most common retention policy applied to the plurality of data artifacts also be applied to the data artifact detected on the computing system.

In one embodiment, a method for applying content-based retention policies to data artifacts may include (1) identifying one or more features of at least one data artifact detected on a computing system, (2) identifying a collection of data artifacts that are (A) stored on at least one storage system and (B) retained in accordance with a set of retention policies, (2) determining, based at least in part on the features, that the data artifact detected on the computing system and at least one data artifact within the collection exceed a certain level of similarity relative to one another, (3) analyzing at least one retention policy of the data artifact within the collection, and then (4) providing a suggestion to apply at least a portion of the retention policy of the data artifact within the collection to the data artifact detected on the computing system.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify one or more features of at least one data artifact detected on a computing system, (2) identify a collection of data artifacts that are (A) stored on at least one storage system and (B) retained in accordance with a set of retention policies, (2) determine, based at least in part on the features, that the data artifact detected on the computing system and at least one data artifact within the collection exceed a certain level of similarity relative to one another, (3) analyze at least one retention policy of the data artifact within the collection, and then (4) provide a suggestion to apply at least a portion of the retention policy of the data artifact within the collection to the data artifact detected on the computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
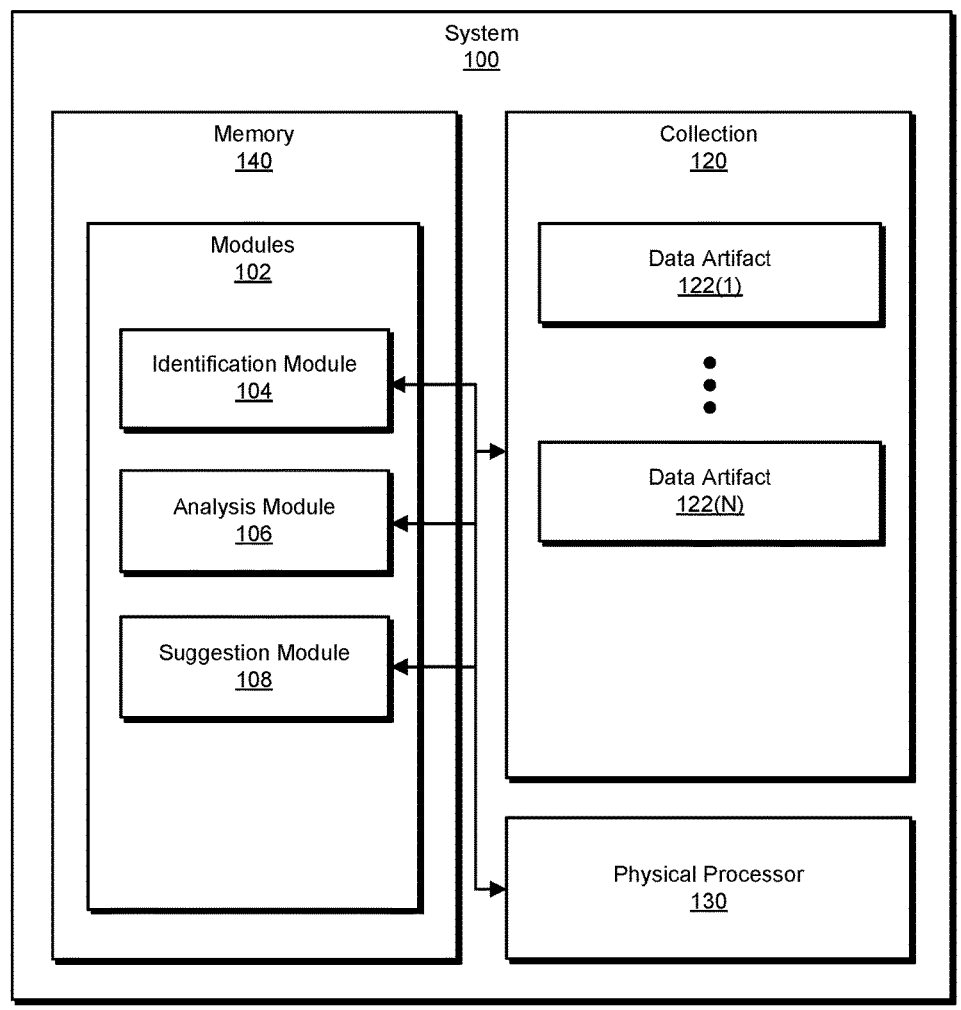
FIG. 1 is a block diagram of an example system for applying content-based retention policies to data artifacts.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for applying content-based retention policies to data artifacts. By analyzing new data artifacts detected on computing systems, the systems and methods described herein may identify and/or extract features of those data artifacts. The systems and methods described herein may then search a collection of existing data artifacts to identify any data artifacts that have features similar to those of the newly detected data artifacts. Upon identifying certain existing data artifacts whose features are similar to those of the newly detected data artifacts, the systems and methods described herein may analyze the retention policies applied to those similar data artifacts.

During this analysis, these systems and methods may identify the types of retention policies (such as a 2-year retention policy, a 5-year retention policy, and/or a legal hold) applied to those similar data artifacts. These systems and methods may then formulate recommendations and/or suggestions for the retention policies to be applied to the newly detected data artifacts based at least in part on the retention policies applied to those similar data artifacts. Upon formulating such recommendations and/or suggestions, these systems and methods may provide the same to a storage administrator so that he or she is aware of the types of retention policies applied to those similar data artifacts. In this example, the types of retention policies applied to those similar data artifacts may be the most appropriate for the newly detected data artifacts.

As a result, the storage administrator may apply the same types of retention policies to the newly detected data artifacts based at least in part on the recommendations and/or suggestions formulated by these systems and methods. In doing so, these systems and methods may be able to remove much of the guesswork from the policy-selection process and/or alleviate the burden placed on storage administrators, thereby facilitating a more uniform and/or appropriate application of retention policies. Accordingly, these systems and methods may be able to improve the functioning of storage systems and/or increase storage efficiency. Additionally or alternatively, these systems and methods may be able to improve network congestion, data transfer rates, and/or the overall functioning of computing devices within networks.

Figure 2:
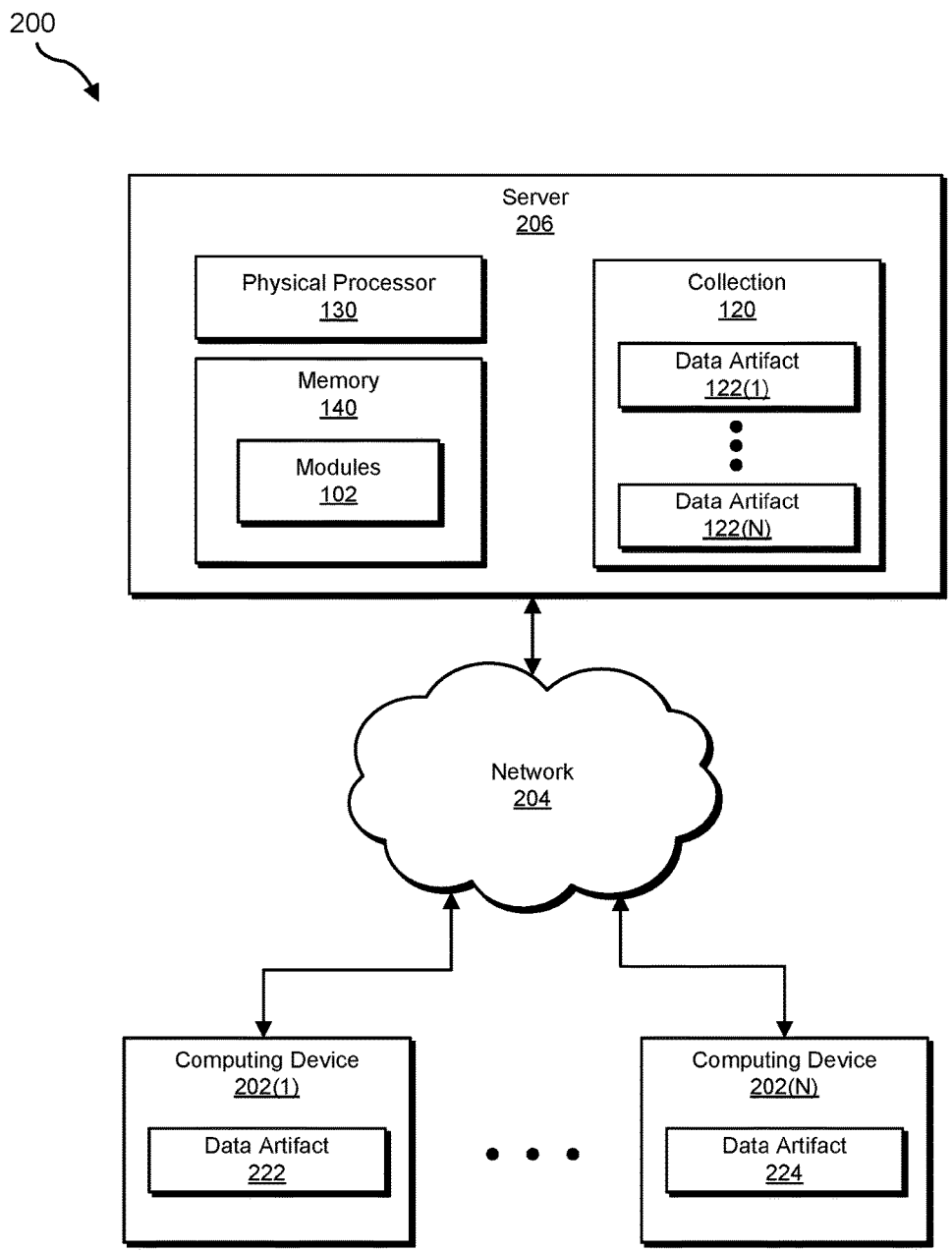
FIG. 2 is a block diagram of an additional example system for applying content-based retention policies to data artifacts.

The following will provide, with reference to FIGS. 1-2, detailed descriptions of example systems for applying content-based retention policies to data artifacts. Detailed descriptions of corresponding computer-implemented methods will be provided in connection with FIG. 3. In addition, detailed descriptions of example data artifact, an example part-of-speech tagging scheme, an example NER tagging scheme, an example keyword, an example set of keywords, and an example process for generating a keyword vector representation will be provided in connection with FIGS. 4-6.

FIG. 1 is a block diagram of an example system 100 for applying content-based retention policies to data artifacts. As illustrated in this figure, example system 100 may include one or more modules 102 for performing one or more tasks. As will be explained in greater detail below, modules 102 may include an identification module 104, an analysis module 106, and a suggestion module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing devices 202(1)-(N) and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate applying content-based retention policies to data artifacts. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more collections of data artifacts, such as collection 120. In one example, collection 120 may include data artifacts 122(1)-(N). Data artifacts 122(1)-(N) each generally represents any type or form of file, data item, and/or data set. In one example, data artifacts 122(1)-(N) may each include and/or represent an email received by a member of an organization. Additional examples of data artifacts 122(1)-(N) include, without limitation, files, email items, communications, documents, data sets, portions of one or more of the same, variations or combinations of one or more of the same, and/or any other suitable data artifacts.

Example system 100 in FIG. 1 may be implemented in a variety of ways. For example, all or a portion of example system 100 may represent portions of example system 200 in FIG. 2. As shown in FIG. 2, system 200 may include computing devices 202(1)-(N) in communication with a server 206 via a network 204. In one example, all or a portion of the functionality of modules 102 may be performed by one or more of computing devices 202(1)-(N), server 206, and/or any other suitable computing system. As will be described in greater detail below, one or more of modules 102 from FIG. 1 may, when executed by at least one processor of computing devices 202(1)-(N) and/or server 206, enable one of computing devices 202(1)-(N) and/or server 206 to apply content-based retention policies to data artifacts. Although FIG. 2 illustrates collection 120 as being part of server 206, collection 120 may additionally and/or alternatively represent part of and/or be included on one or more of computing devices 202(1)-(N).

Computing devices 202(1)-(N) each generally represent any type or form of computing device capable of reading computer-executable instructions. In one example, computing device 202(1) may include and/or represent a storage controller and/or storage system. In another example, computing device 202(N) may include and/or represent a client device and/or backup system. Additional examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, storage systems, variations or combinations of one or more of the same, and/or any other suitable computing devices.

Server 206 generally represents any type or form of computing device capable of storing data artifacts, determining appropriate retention policies for data artifacts, and/or applying retention policies to data artifacts. In one example, server 206 may include and/or represent a storage controller and/or storage system. In another example, server 206 may include and/or represent a client device and/or backup system. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Data artifacts 222 and 224 each generally represent any type or form of file, data item, and/or data set. In one example, data artifacts 222 and 224 may each include and/or represent an email received by a member of an organization. Additional examples of data artifacts 222 and 224 include, without limitation, files, emails items, communications, documents, data sets, portions of one or more of the same, variations or combinations of one or more of the same, and/or any other suitable data artifacts.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
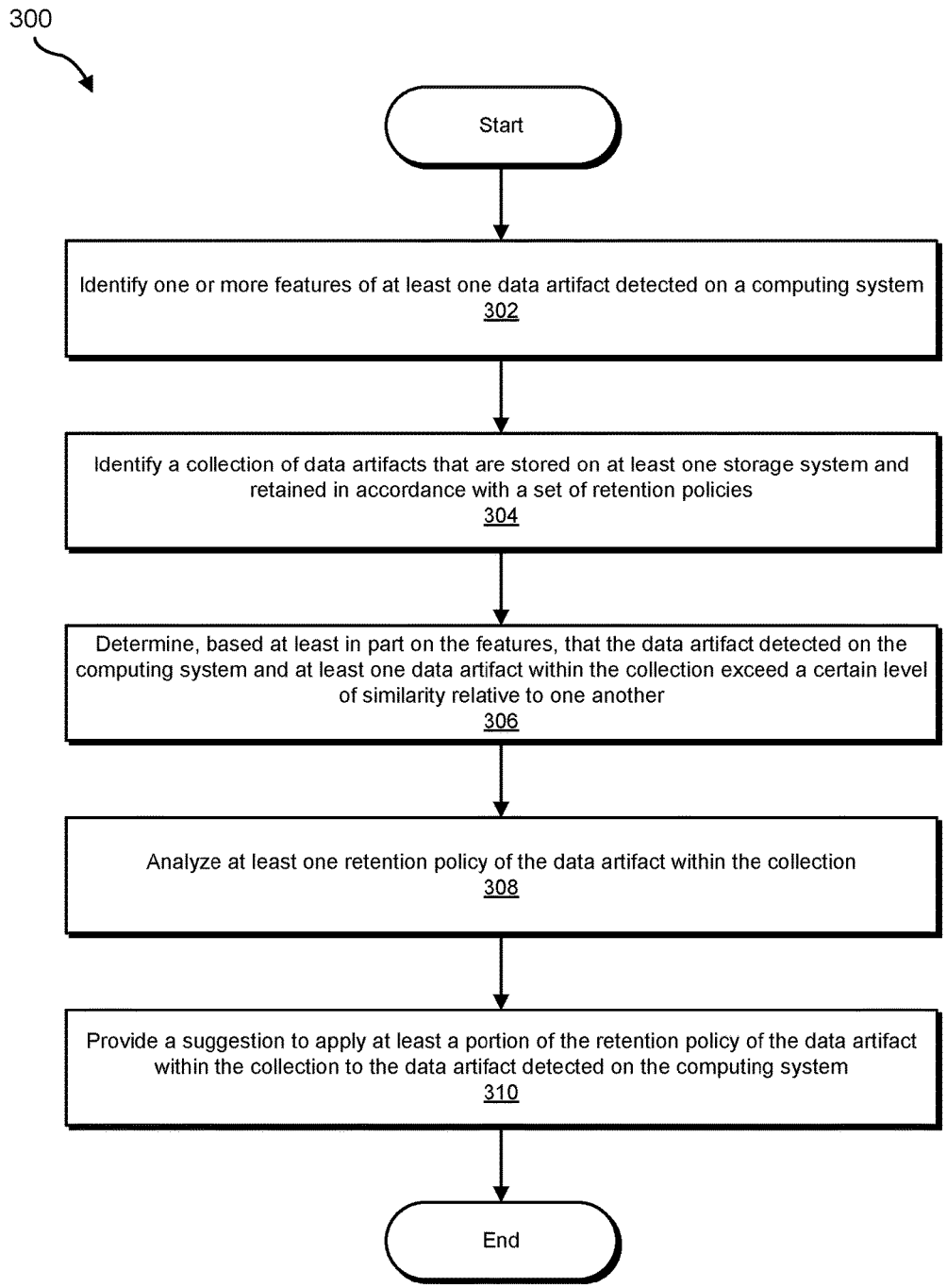
FIG. 3 is a flow diagram of an example method for applying content-based retention policies to data artifacts.

FIG. 3 is a flow diagram of an example computer-implemented method 300 for applying content-based retention policies to data artifacts. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify one or more features of at least one data artifact detected on a computing system. For example, identification module 104 may, as part of one of computing devices 202(1)-(N) or server 206 in FIG. 2, identify one or more features of data artifact 222 detected on computing device 202(1). Examples of such features include, without limitation, attributes, characteristics, statistics, keywords, variations or combinations of one or more of the same, and/or any other types of features.

The systems described herein may perform step 302 in a variety of ways and/or contexts. In some examples, identification module 104 may identify these features of data artifact 222 based at least in part on an analysis performed on data artifact 222 and/or its metadata. For example, identification module 104 and/or analysis module 106 may analyze data artifact 222 and/or its metadata and then extract certain features of data artifact 222 based at least in part on this analysis. Upon extraction of these features, identification module 104 may identify these features as belonging to and/or representing data artifact 222.

In one example, identification module 104 may identify at least one keyword that is representative of data artifact 222. In this example, identification module 104 and/or analysis module 106 may create a subset of text that is included in content of data artifact 222 and represents a certain part of speech. Additionally or alternatively, identification module 104 and/or analysis module 106 may create another subset of text that is included in the content of data artifact 222 and represents certain categories of words consistent with NER. Finally, identification module 104 and/or analysis module 106 may determine the keyword by identifying which text is included in the subset of text that represents the certain part of speech and excluded from the other subset of text that represents certain categories of words consistent with NER.

Figure 4:
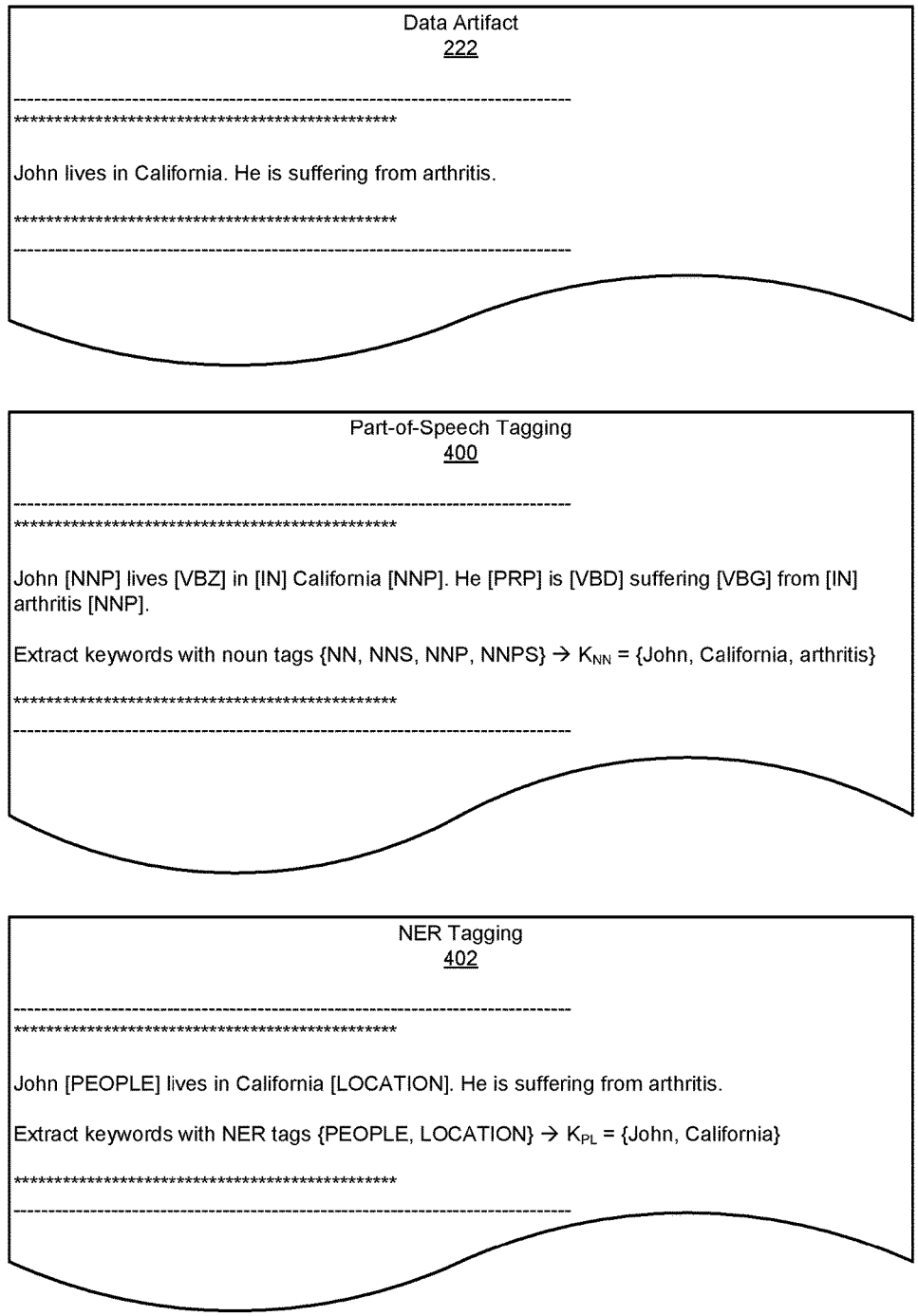
FIG. 4 is an illustration of an example data artifact, an example part-of-speech tagging scheme, an example NER tagging scheme.

As a specific example, identification module 104 may identify data artifact 222 in FIG. 4. As illustrated in FIG. 4, data artifact 222 may include and/or represent a text string that reads "John lives in California. He is suffering from arthritis." In this example, identification module 104 and/or analysis module 106 may perform part-of-speech tagging 400 on data artifact 222 (in this example, "John [NNP] lives [VBZ] in [IN] California [NNP]. He [PRP] is [VBD] suffering [VBG] from [IN] arthritis [NNP]."). The term "part-of-speech tagging," as used herein, generally refers to any process of classifying and/or marking words found in text as corresponding to and/or representing a certain part of speech.

In this example, identification module 104 and/or analysis module 106 may then create a subset of text that is included in data artifact 222 in FIG. 4 and represents a certain type of noun (in this example, "{NN, NNS, NNP, NNPS}") from part-of-speech tagging 400. For example, identification module 104 and/or analysis module 106 may create a subset of text (in this example, "$K_{NN}$={John, California, arthritis}") that includes any singular or plural common nouns and/or singular or plural proper nouns found in data artifact 222.

Continuing with this example, identification module 104 and/or analysis module 106 may perform NER tagging 402 on data artifact 222. The term "named-entity recognition tagging" and the abbreviation "NER tagging," as used herein, generally refer to any process of classifying and/or marking words found in text as corresponding to and/or representing the names of persons, organizations, locations, expressions of time, monetary values, and/or percentages. In one example, identification module 104 and/or analysis module 106 may then create a subset of text that is included in data artifact 222 in FIG. 4 and represents the name of a person or location. For example, identification module 104 and/or analysis module 106 may create a subset of text (in this example, "$K_{RL}$={John, California}") that includes any names of people or locations found in data artifact 222.

Upon creating these subsets of text, identification module 104 and/or analysis module 106 may perform certain operations on the subsets of text to determine one or more keywords that are representative of data artifact 222. For example, identification module 104 and/or analysis module 106 may identify the word "arthritis" as being included in the subset of text that represents the common and proper nouns. In this example, identification module 104 and/or analysis module 106 may identify the word "arthritis" as being excluded from the subset of text that represents the names of people and/or locations. Identification module 104 and/or analysis module 106 may then select the word "arthritis" as a keyword 500 in FIG. 5 to represent data artifact 222 since this word is included in the subset of text that represents the common proper nouns but is excluded from the subset of text that represents the names of people and/or locations.

Returning to FIG. 3, at step 304 one or more of the systems described herein may identify a collection of data artifacts that are stored on at least one storage system and retained in accordance with a set of retention policies. For example, identification module 104 may, as part of one of computing devices 202(1)-(N) or server 206 in FIG. 2, identify collection 120 of data artifacts 122(1)-(N) that are stored on server 206 and retained in accordance with a set of retention policies. The term "retention policy," as used herein, generally refers to any type or form of policy and/or set of rules that governs and/or defines the amount of time that a data artifact is stored and/or maintained on a storage device.

In one example, a retention policy may include and/or identify a retention period that indicates how long a data artifact is stored and/or maintained by a certain storage device and/or tier within a storage system. In this example, the retention policy may also include and/or identify a directive and/or instruction that indicates what to do with the data artifact once the retention period of the data artifact's retention policy has expired.

The systems described herein may perform step 304 in a variety of ways and/or contexts. In some examples, identification module 104 may identify collection 120 as collection 120 is allocated and/or built on server 206 and/or one or more of computing devices 202(1)-(N). For example, server 206 may detect and/or receive a data artifact to be stored and/or maintained for a certain period of time. In this example, server 206 may apply a retention policy to the data artifact and store the data artifact in collection 120 in accordance with the retention policy. As the data artifact is added to collection 120 for storage, identification module 104 may identify collection 120.

In some examples, identification module 104 may search server 206 and/or one or more of computing devices 202(1)-(N) for any existing data artifacts that are stored and/or retained in accordance with retention policies. During this search, identification module 104 may identify collection 120 on server 206 and/or one or more of computing devices 202(1)-(N). In this example, identification module 104 may determine that collection 120 includes data artifacts 122(1)-(N).

In one example, identification module 104 and/or analysis module 106 may create a set of keywords that are representative of data artifact 222 based at least in part on the search history of collection 120 and/or another database. For example, identification module 104 and/or analysis module 106 may expand the keyword "arthritis" to include additional words that co-occurred with the keyword "arthritis" in certain searches recorded in connection with collection 120 and/or another database. In this example, identification module 104 and/or analysis module 106 may identify a history of keyword searches of collection 120 and/or another database.

Upon identifying this history of keyword searches, identification module 104 and/or analysis module 106 may determine which words co-occurred with the keyword "arthritis" in searches conducted on collection 120 and/or the other database. In one example, identification module 104 and/or analysis module 106 may identify one or more words that co-occurred with the keyword "arthritis" as recorded in the history. For example, identification module 104 and/or analysis module 106 may determine that the words "disease," "pain," "muscle," "health," "fitness," and/or "treatment" were each entered along with the keyword "arthritis" into a search of collection 120 and/or the other database more than 5 times. As a result, identification module 104 and/or analysis module 106 may build a set of keywords 502 in FIG. 5 that includes the words "arthritis," "disease," "pain," "muscle," "health," "fitness," and/or "treatment" by using the word "arthritis" as the base word and adding the remaining words to the set due at least in part to their co-occurrence with the base word in previous searches of collection 120 and/or the other database.

Figure 5:
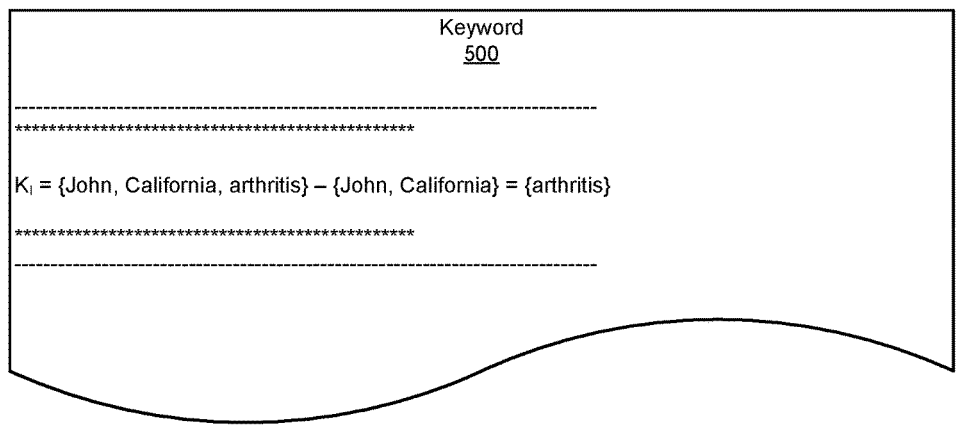
FIG. 5 is an illustration of an example keyword and an example set of keywords.
Figure 5:
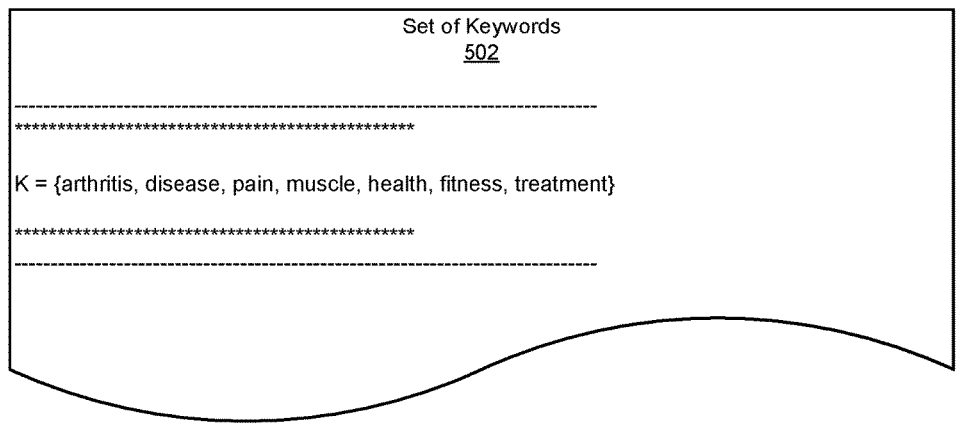
Figure 6:
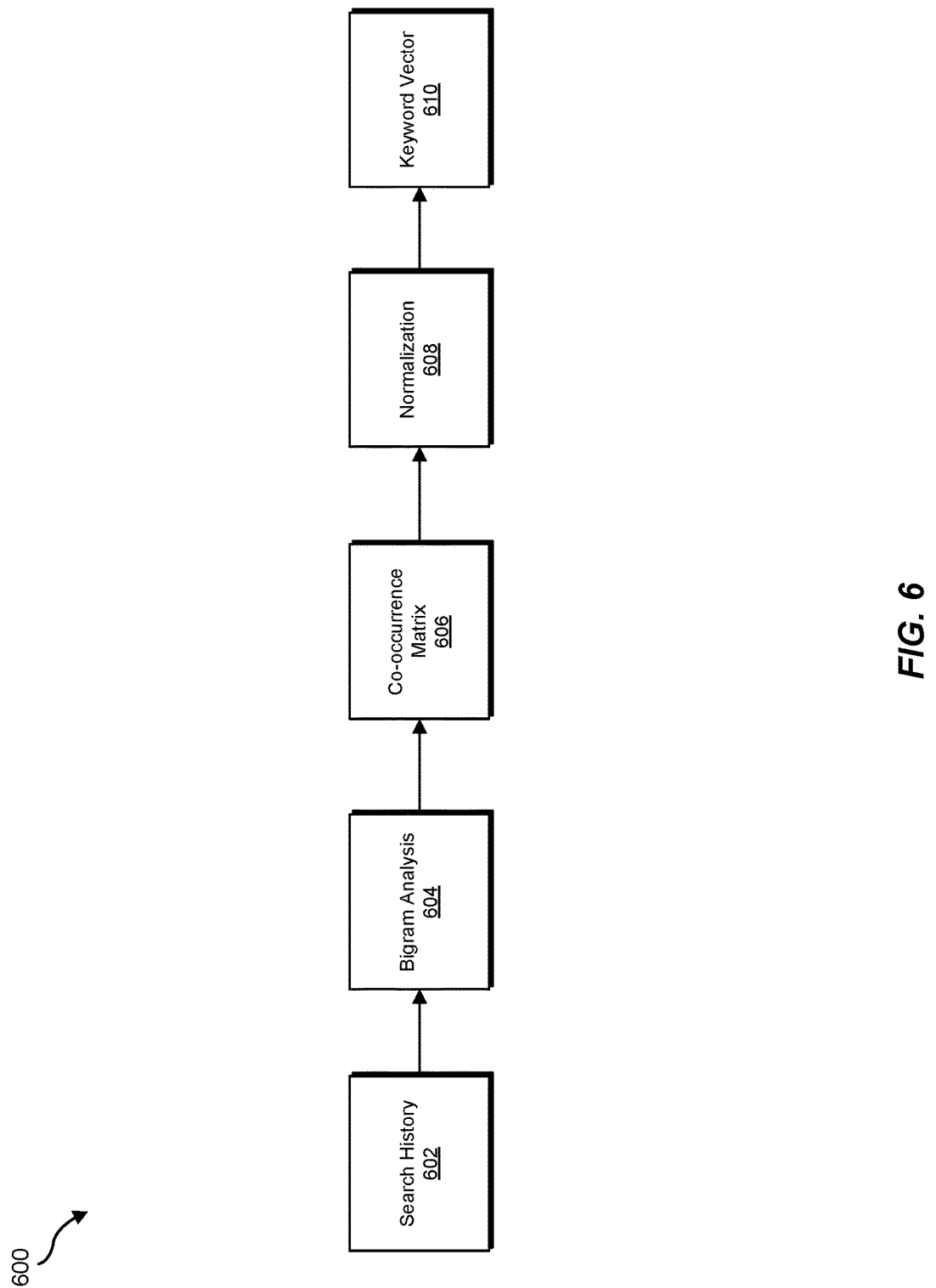
FIG. 6 is an illustration of an example process for generating a keyword vector.

In one example, identification module 104 and/or analysis module 106 may generate a vector representation of set of keywords 502 in FIG. 5. For example, identification module 104 and/or analysis module 106 may create and/or generate a keyword vector 610 in FIG. 6. In this example, identification module 104 and/or analysis module 106 may identify a search history 602 and then perform a bigram analysis 604 on a set of words found in search history 602. In this context, bigram analysis 604 may reveal and/or indicate the frequency of co-occurrence among the set of words. Identification module 104 and/or analysis module 106 may then create and/or generate a co-occurrence matrix 606 that includes various columns and/or rows.

In co-occurrence matrix 606, each column may represent a different word within the set of words, and each row may represent a different word within the set of words. The intersection between a row and a column may include a number that represents and/or identifies the frequency of co-occurrence for the word represented by that column and the word represented by that row. In one example, identification module 104 and/or analysis module 106 may perform a normalization 608 of these numbers to a range between 0 and 1. Accordingly, each column and/or row of co-occurrence matrix 606 may represent and/or amount to a keyword vector 610 that numerically identifies the frequency of co-occurrence for the word represented by that column and/or row with respect to the rest of the set of words.

Returning to FIG. 3, at step 306 one or more of the systems described herein may determine, based at least in part on the features, that the data artifact detected on the computing system and at least one data artifact within the collection exceed a certain level of similarity relative to one another. For example, analysis module 106 may, as part of one of computing devices 202(1)-(N) or server 206 in FIG. 2, determine that the data artifact 222 and one or more of data artifacts 122(1)-(N) exceed a certain level of similarity relative to one another. In this example, analysis module 106 may arrive at this determination based at least in part on the features of data artifact 222.

The systems described herein may perform step 306 in a variety of ways and/or contexts. In some examples, analysis module 106 may determine that data artifact 222 is similar to data artifact 122(1) by comparing the features of data artifact 222 to the features of data artifact 122(1). For example, analysis module 106 may search collection 120 for any data artifacts that include the keyword "arthritis". During the search, analysis module 106 may identify data artifact 122(1) as including the keyword "arthritis". In this example, analysis module 106 may determine that data artifact 122(1) has at least this feature that matches a feature of data artifact 222. As a result, analysis module 106 may determine that data artifact 222 and data artifact 122(1) are sufficiently similar to one another so as to use the retention policy of data artifact 122(1) as a reference and/or template for the retention policy of data artifact 222.

Additionally or alternatively, analysis module 106 may determine that data artifact 222 is similar to data artifact 122(N) by comparing the features of data artifact 222 to the features of data artifact 122(N). For example, while searching collection 120 for any data artifacts that include the keyword "arthritis," analysis module 106 may identify data artifact 122(N) as including the keyword "arthritis". In this example, analysis module 106 may determine that data artifact 122(N) has at least this feature that matches a feature of data artifact 222. As a result, analysis module 106 may determine that data artifact 222 and data artifact 122(N) are sufficiently similar to one another so as to use the retention policy of data artifact 122(N) as a reference and/or template for the retention policy of data artifact 222.

As another example, analysis module 106 may search collection 120 for any data artifacts that include a certain amount of set of keywords 502 in FIG. 5. In one example, analysis module 106 may determine, during the search, that data artifact 122(1) includes a certain percentage of the keywords from set of keywords 502 in FIG. 5. For example, analysis module 106 may determine that data artifact 122(1) includes the words "arthritis," "disease," "pain," "muscle," and "treatment". As a result, analysis module 106 may determine that data artifact 122(1) includes more than 70% of set of keywords 502 in FIG. 5. As a result, analysis module 106 may determine that data artifact 222 and data artifact 122(1) are sufficiently similar to one another so as to use the retention policy of data artifact 122(1) as a reference and/or template for the retention policy of data artifact 222.

In a further example, analysis module 106 may determine, during the search, that data artifact 122(1) includes a threshold number of the keywords from set of keywords 502 in FIG. 5. For example, analysis module 106 may determine that data artifact 122(1) includes the words "arthritis," "disease," "pain," "muscle," and "treatment". As a result, analysis module 106 may determine that data artifact 122(1) includes more than 3 keywords from set of keywords 502 in FIG. 5. As a result, analysis module 106 may determine that data artifact 222 and data artifact 122(1) are sufficiently similar to one another so as to use the retention policy of data artifact 122(1) as a reference and/or template for the retention policy of data artifact 222.

Returning to FIG. 3, at step 308 one or more of the systems described herein may analyze at least one retention policy of the data artifact within the collection. For example, analysis module 106 may, as part of one of computing devices 202(1)-(N) or server 206 in FIG. 2, analyze at least one retention policy of data artifact 122(1) within collection 120. In one example, a retention policy may call for a data artifact to be stored and/or preserved for a certain period of time (such as 1 year, 2 years, or 5 years). Alternatively, a retention policy may include and/or represent a legal hold that calls for a data artifact to be stored and/or preserved indefinitely.

The systems described herein may perform step 308 in a variety of ways and/or contexts. In some examples, analysis module 106 may analyze the retention policy of data artifact 122(1) by identifying the retention period applied to the data artifact 122(1) under the retention policy. For example, analysis module 106 may determine that the retention policy of data artifact 122(1) requires the retention of data artifact 122(1) for 2 years from the date of the artifact's creation or 2 years from the date that the retention policy was originally applied to data artifact 122(1). In another example, analysis module 106 may determine that the retention policy of data artifact 122(1) requires the retention of data artifact 122(1) for 5 years from the date of the artifact's creation or 5 years from the date that the retention policy was originally applied to data artifact 122(1). In a further example, analysis module 106 may determine that the retention policy of data artifact 122(1) requires the retention of data artifact 122(1) for an indefinite period of time due at least in part to a legal hold placed on data artifact 122(1).

Returning to FIG. 3, at step 310 one or more of the systems described herein may provide a suggestion to apply at least a portion of the retention policy of the data artifact within the collection to the data artifact detected on the computing system. For example, suggestion module 108 may, as part of one of computing devices 202(1)-(N) or server 206 in FIG. 2, provide a suggestion to apply at least a portion of the retention policy of data artifact 122(1) within collection 120 to data artifact 222 detected on computing device 202(1). In this example, the suggestion may indicate and/or identify, among other things, the type of policy (such as retention or legal hold) and/or the length of retention (such as 2 years, 5 years, or indefinitely) recommended for data artifact 222.

The systems described herein may perform step 310 in a variety of ways and/or contexts. In some examples, suggestion module 108 may provide the suggestion to an administrator that oversees storage of computing device 202(1), server 206, and/or a storage device that is to store data artifact 222. Upon receiving this suggestion, the administrator may select and/or apply a retention policy for data artifact 222 based at least in part on the suggestion. For example, in the event that data artifact 122(1) has a 2-year retention policy, suggestion module 108 may provide the administrator with a suggestion to apply a 2-year retention policy to data artifact 222. In response, the administrator may apply a 2-year retention policy to data artifact 222 to store and/or maintain data artifact 222 for a period of 2 years.

Similarly, in the event that data artifact 122(1) has a 5-year retention policy, suggestion module 108 may provide the administrator with a suggestion to apply a 5-year retention policy to data artifact 222. In response, the administrator may apply a 5-year retention policy to data artifact 222 to store and/or maintain data artifact 222 for a period of 5 years. Alternatively, in the event that data artifact 122(1) has a legal hold, suggestion module 108 may provide the administrator with a suggestion to apply a legal hold to data artifact 222. In response, the administrator may apply a legal hold to data artifact 222 to store and/or maintain data artifact 222 indefinitely.

As explained above in connection with FIGS. 1-6, the systems and methods described herein may provide and/or support intelligent retention policy management. As a result, these systems and methods may help reduce the storage costs of organizations and free up more expensive storage devices based at least in part on and/or in view of the content of the data being stored. For example, a computing device may detect a new data artifact and then extract various features from that data artifact. In this example, the computing device may search a database of data artifacts being stored in connection with a retention policy for any data artifacts with features similar to those of the newly detected data artifact. During the search, the computing device may find various data artifacts with similar features.

As a specific example, the computing device may find similar data artifacts identified as documents 189, 121, 250, 529, 184, 5, and 320. In this example, documents 189, 529, and 320 may each have a retention policy of 2 years. In addition, documents 121 and 184 may each have a retention policy of 5 years. Documents 250 and 5 may each have a legal hold.

Continuing with this example, the computing device may apply intelligent retention policy management by suggesting a retention policy for the newly detected data artifact based at least in part on the retention policies of documents 189, 121, 250, 529, 184, 5, and 320. The computing device may use various heuristics, criteria, and/or techniques to determine which retention policy to suggest. For example, the computing device may select the retention policy that is most common among all of documents 189, 121, 250, 529, 184, 5, and 320. Alternatively, the computing device may select the retention policy that is most common among the top 25% of those documents that are most similar to the newly detected data artifact.

In one example, by selecting the most common retention policy among all of the documents, the computing device may provide an administrator with a suggestion to apply a 2-year retention policy to the newly detected data artifact. In addition, the suggestion may identify a policy interval of 2 to 5 years to indicate that the documents similar to the newly detected data artifact had retention policies that ranged from 2 to 5 years. In response, the administrator may apply a 2-year retention policy to the newly detected data artifact to ensure that this data artifact is stored and/or preserved for at least 2 years. Accordingly, the administrator may be able to select the most appropriate and/or cost-effective retention policy for the newly detected data artifact based at least in part on the content of the data artifact, and the administrator does not have to manually identify the features of the data artifact and/or any similar data artifacts in order to determine the most appropriate and/or cost-effective retention policy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for applying content-based retention policies to data artifacts, at least a portion of the method being performed by a computing device comprising at least one processor, the method comprising:
  identifying one or more features of at least one data artifact detected on a computing system;
  identifying a collection of data artifacts that are:
    stored on at least one storage system;
    retained in accordance with a set of retention policies;
  determining, based at least in part on the features, that the data artifact detected on the computing system and at least one data artifact within the collection exceed a certain level of similarity relative to one another;
  analyzing at least one retention policy of the data artifact within the collection;

implementing intelligent retention policy management that increases storage efficiency in connection with the data artifact detected on the computing system by:
providing a suggestion to apply at least a portion of the retention policy to the data artifact detected on the computing system due at least in part to the data artifact within the collection and the data artifact detected on the computing system exceeding the certain level of similarity relative to one another;
applying the suggested portion of the retention policy to the data artifact detected on the computing system.

2. The method of claim 1, wherein identifying the features of the data artifact detected on the computing system comprises:
analyzing the data artifact detected on the computing system;
extracting the features of the data artifact based at least in part on the analysis.

3. The method of claim 2, wherein extracting the features of the data artifact comprises identifying at least one keyword that is representative of the data artifact.

4. The method of claim 3, wherein identifying the keyword that is representative of the data artifact comprises:
creating a subset of text that is included in content of the data artifact and represents a certain part of speech;
creating another subset of text that is included in the content of the data artifact and represents certain categories of words consistent with Name-Entity Recognition (NER);
determining the keyword by identifying which text is included in the subset of text and excluded from the other subset of text.

5. The method of claim 3, wherein determining that the data artifact detected on the computing system and the data artifact within the collection exceed the certain level of similarity comprises determining that the data artifact within the collection includes the keyword.

6. The method of claim 3, wherein identifying the keyword that is representative of the data artifact comprises creating a set of keywords that are representative of the data artifact by:
identifying at least one keyword that is extracted from the data artifact;
identifying a history of keyword searches of the collection of data artifacts;
determining that at least one word co-occurred with the keyword in a certain number of keyword searches recorded in the history;
adding the word along with the keyword to the set of keywords representative of the data artifact.

7. The method of claim 6, wherein determining that the data artifact detected on the computing system and the data artifact within the collection exceed the certain level of similarity comprises determining that the data artifact within the collection includes a certain amount of keywords within the set.

8. The method of claim 6, wherein creating the set of keywords comprises generating a vector representation of the set of keywords that facilitates comparing the features of the data artifact detected on the computing system to the features of the data artifacts within the collection.

9. The method of claim 1, wherein determining that the data artifact detected on the computing system and the data artifact within the collection exceed the certain level of similarity comprises searching the collection for any data artifacts whose similarity to the data artifact detected on the computing system exceeds the certain level by determining which of the data artifacts within the collection have features that match the features of the data artifact detected on the computing system.

10. The method of claim 1, wherein:
determining that the data artifact detected on the computing system and the data artifact within the collection exceed the certain level of similarity comprises determining that the data artifact detected on the computing system and a plurality of data artifacts within the collection exceed the certain level of similarity;
analyzing the retention policy of the data artifact within the collection comprises:
identifying a plurality of retention policies that apply to the plurality of data artifacts;
determining which retention policy is most common among the plurality of retention policies that apply to the plurality of data artifacts.

11. The method of claim 10, wherein providing the suggestion to apply the portion of the retention policy of the data artifact within the collection to the data artifact detected on the computing system comprises recommending that the most common retention policy applied to the plurality of data artifacts also be applied to the data artifact detected on the computing system.

12. The method of claim 1, wherein the features of the data artifact detected on the computing system comprise metadata of the data artifact.

13. A system for applying content-based retention policies to data artifacts, the system comprising:
an identification module, stored in memory, that:
identifies one or more features of at least one data artifact detected on a computing system;
identifies a collection of data artifacts that are:
stored on at least one storage system;
retained in accordance with a set of retention policies;
an analysis module, stored in memory, that:
determines, based at least in part on the features, that the data artifact detected on the computing system and at least one data artifact within the collection exceed a certain level of similarity relative to one another;
analyzes at least one retention policy of the data artifact within the collection;
a suggestion module, stored in memory, that implements intelligent retention policy management that increases storage efficiency in connection with the data artifact detected on the computing system by:
providing suggestion to apply at least a portion of the retention policy to the data artifact detected on the computing system due at least in part to the data artifact within the collection and the data artifact detected on the computing system exceeding the certain level of similarity relative to one another;
causing the suggested portion of the retention policy to be applied to the data artifact detected on the computing system;
at least one physical processor that executes the identification module, the analysis module, and the suggestion module.

14. The system of claim 13, wherein the analysis module:
analyzes the data artifact detected on the computing system;
extracts the features of the data artifact based at least in part on the analysis.

15. The system of claim 14, wherein the identification module identifies at least one keyword that is representative of the data artifact.

16. The system of claim 15, wherein the analysis module:
creating a subset of text that is included in content of the data artifact and represents a certain part of speech;
creating another subset of text that is included in the content of the data artifact and represents certain categories of words consistent with Name-Entity Recognition (NER);
determining the keyword by identifying which text is included in the subset of text and excluded from the other subset of text.

17. The system of claim 15, wherein the analysis module determines that the data artifact within the collection includes the keyword.

18. The system of claim 15, wherein the analysis module creates a set of keywords that are representative of the data artifact by:
determining that at least one word co-occurred with at least one keyword extracted from the data artifact in a certain number of keyword searches recorded in a history of keyword searches of the collection of data artifacts;
adding the word along with the keyword to the set of keywords representative of the data artifact.

19. The system of claim 18, wherein the analysis module determines that the data artifact within the collection includes a certain amount of the keywords within the set.

20. A non-transitory computer-readable medium comprising one or more computer-executable instructions that, when executed by at least one processor of a computing device, cause the computing device to:
identify one or more features of at least one data artifact detected on a computing system;
identify a collection of data artifacts that are:
stored on at least one storage system;
retained in accordance with a set of retention policies;
determine, based at least in part on the features, that the data artifact detected on the computing system and at least one data artifact within the collection exceed a certain level of similarity relative to one another;
analyze at least one retention policy of the data artifact within the collection;
implementing intelligent retention policy management that increases storage efficiency in connection with the data artifact detected on the computing system by:
providing a suggestion to apply at least a portion of the retention policy to the data artifact detected on the computing system due at least in part to the data artifact within the collection and the data artifact detected on the computing system exceeding the certain level of similarity relative to one another;
applying the suggested portion of the retention policy to the data artifact detected on the computing system.

* * * * *